United States Patent
Nagata et al.

(10) Patent No.: US 8,706,986 B2
(45) Date of Patent: *Apr. 22, 2014

(54) LOAD EQUALIZING STORAGE CONTROLLER AND CONTROL METHOD FOR THE SAME

(75) Inventors: Koji Nagata, Kaisei (JP); Yuko Matsui, Odawara (JP); Masaaki Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/954,938

(22) Filed: Nov. 29, 2010

(65) Prior Publication Data

US 2011/0072228 A1    Mar. 24, 2011

Related U.S. Application Data

(63) Continuation of application No. 11/968,363, filed on Jan. 2, 2008, now Pat. No. 7,865,676.

(30) Foreign Application Priority Data

May 29, 2007    (JP) .................................. 2007-142426

(51) Int. Cl.
*G06F 12/02* (2006.01)
(52) U.S. Cl.
USPC .......................................... 711/161; 709/217

(58) Field of Classification Search
USPC ........................................... 711/161; 709/217
See application file for complete search history.

(56) References Cited

U.S. PATENT DOCUMENTS

| | | |
|---|---|---|
| 6,675,268 B1 | 1/2004 | DeKoning et al. |
| 2006/0129784 A1 | 6/2006 | Nakayama et al. |
| 2006/0179122 A1 | 8/2006 | Ido et al. |
| 2006/0224826 A1 | 10/2006 | Arai et al. |
| 2007/0094357 A1 | 4/2007 | Sugitani et al. |
| 2008/0127198 A1 | 5/2008 | Cometto et al. |
| 2008/0301385 A1 | 12/2008 | Nagata et al. |

FOREIGN PATENT DOCUMENTS

| | | |
|---|---|---|
| EP | 1486862 A2 | 12/2004 |
| EP | 1936487 A2 | 6/2008 |
| JP | 91469842 | 6/1997 |
| JP | 11312058 | 11/1999 |

*Primary Examiner* — Jared Rutz
(74) *Attorney, Agent, or Firm* — Brundidge & Stanger, P.C.

(57) ABSTRACT

An object of the invention is to provide a storage controller and control method that can efficiently and easily prevent reduced data I/O processing performance due to an imbalance between loads on controllers. In the storage controller and control method for providing, to a host computer, logical volumes created in a storage area provided by a storage device and controlling data I/O to/from the logical volumes, the state of loads on the control units for controlling data I/O to/from the logical volumes is monitored, and a control unit allocated to a logical volume is changed to another control unit to equalize loads on the control units.

20 Claims, 12 Drawing Sheets

FIG.3A
■MEMORY SPACE VIEWED FROM PROCESSOR

| ADR | | | |
|---|---|---|---|
| 0x0_00000000-0x0_7FFFFFFF | CTL0 MEMORY MAP (CTL0 PROCESSOR) | CTL1 MEMORY MAP (CTL1 PROCESSOR) | |
| 0x0_80000000-0x0_FFFFFFFF | CT_0 LOCAL MEMORY | CTL1 LOCAL MEMORY | |
| 0x1_00000000-0x1_7FFFFFFF | CT_0 BRIDGE REGISTER | CTL1 BRIDGE REGISTER | |
| | CT_0 HOST COMMUNICATION PROTOCOL CHIP REGISTER | CTL1 HOST COMMUNICATION PROTOCOL CHIP REGISTER | |
| | CT_0 STORAGE DEVICE COMMUNICATION PROTOCOL CHIP REGISTER | CTL1 STORAGE DEVICE COMMUNICATION PROTOCOL CHIP REGISTER | |
| 0x1_80000000-0x1_FFFFFFFF | CT_0 DATA TRANSFER CONTROLLER REGISTER | CTL1 DATA TRANSFER CONTROLLER REGISTER | |
| 0x2_00000000-0x5_FFFFFFFF | CT_0&1 CACHE MEMORY (INCLUDING ADDITIONAL MEMORY (1) TO (3)) | CTL0&1 CACHE MEMORY (INCLUDING ADDITIONAL MEMORY (1) TO (3)) | |
| 0x6_00000000-0x6_7FFFFFFF | CT_1 LOCAL MEMORY | CTL0 LOCAL MEMORY | |
| 0x6_80000000-0x6_FFFFFFFF | CT_1 BRIDGE REGISTER | CTL0 BRIDGE REGISTER | |
| 0x7_00000000-0x7_7FFFFFFF | CT_1 HOST COMMUNICATION PROTOCOL CHIP REGISTER | CTL0 HOST COMMUNICATION PROTOCOL CHIP REGISTER | |
| | CT_1 STORAGE DEVICE COMMUNICATION PROTOCOL CHIP REGISTER | CTL0 STORAGE DEVICE COMMUNICATION PROTOCOL CHIP REGISTER | |
| 0x7_80000000-0x7_7FFFFFFF | CT_1 DATA TRANSFER CONTROLLER REGISTER | CTL0 DATA TRANSFER CONTROLLER REGISTER | |

30A　30B　30C

FIG.3B
■MEMORY SPACE VIEWED FROM HOST COMMUNICATION PROTOCOL CHIP

| ADR | | | |
|---|---|---|---|
| 0x0_00000000-0x0_7FFFFFFF | CTL0 MEMORY MAP (CTL0 HOST COMMUNICATION PROTOCOL CHIP) | CTL1 MEMORY MAP (CTL1 HOST COMMUNICATION PROTOCOL CHIP) | |
| 0x0_80000000-0x0_FFFFFFFF | CT_0 LOCAL MEMORY | CTL1 LOCAL MEMORY | |
| 0x1_00000000-0x0_FFFFFFFF | CT_1 LOCAL MEMORY | CTL0 LOCAL MEMORY | |
| 0x1_00000000-0xF_7FFFFFFF | CT_0&1 CACHE MEMORY (INCLUDING ADDITIONAL MEMORY (1) TO (3)) | CTL0&1 CACHE MEMORY (INCLUDING ADDITIONAL MEMORY (1) TO (3)) | |

| ITEM | DETAIL | |
|---|---|---|
| ALLOCATED CONTROLLER | 0x00 : ALLOCATED TO CONTROLLER 0<br>0x01 :ALLOCATED TO CONTROLLER 1<br>0xFF :LU NOT DEFINED | }43CA |
| ALLOCATED CORE | 0x00 :ALLOCATED TO X CORE<br>0x01 :ALLOCATED TO Y CORE<br>0xFF :LU NOT DEFINED | }43CB |

| ITEM | DETAIL | |
|---|---|---|
| PAIR STATE | 00 : SMPL···PAIR NOT DEFINED<br>01 : COPY···INITIAL COPY/RESYNCHRONIZING COPY<br>02 : PAIR···DATA IN PRIMARY AND SECONDARY VOLUMES MATCH<br>03 : PSUS···SPLIT STATE<br>04 : PSUE···FAILURE OCCURRENCE/SUSPENDED<br>05 : MIX···PAIR STATE MIXED (POSSIBLY PRIMARY ONLY) | 44CA |
| PAIR ATTRIBUTE | 00 : PRIMARY VOL<br>01 : SECONDARY VOL | 44CB |
| LUN PAIRED VOLUME'S LUN | LUN OF PAIRED VOLUME<br>※VALID ONLY WHEN RELEVANT VOLUME IS SECONDARY | 44CC |
| MIRROR NUMBER | 0~7<br>※VALID ONLY WHEN RELEVANT VOLUME IS SECONDARY | 44CD |
| COPY SPEED | 81~85 : SLOW<br>86~8A : REGULAR<br>8B~8F : FAST<br>※VALID ONLY WHEN RELEVANT VOLUME IS SECONDARY | 44CE |
| GROUP TYPE | 00 : GROUP ID INVALID<br>01 : GROUP ID VALID<br>※VALID ONLY WHEN RELEVANT VOLUME IS SECONDARY | 44CF |
| GROUP ID | 0~255 | 44CG |
| SECONDARY LUN | LUN OF SECONDARY LU<br>0~2047(S)/4095(M, H)<br>INITIAL VALUE (FFFF)H: NOT DEFINED<br>※VALID ONLY WHEN RELEVANT VOLUME IS PRIMARY | 44CH |

| ITEM | DETAIL | |
|---|---|---|
| PAIR STATE | 00 : SMPL···PAIR NOT DEFINED<br>01 : COPY···COPYING DATA TO BE RESTORED<br>02H : PAIR···DATA IN PRIMARY AND SECONDARY VOLUMES MATCH<br>03 : PSUS···SPLIT STATE<br>04 : PSUS···FAILURE OCCURRENCE/SUSPENDED<br>05 : MIX···PAIR STATE MIXED<br>06 : SMPLS···SMPL(SECONDARY VOL IMAGE ALREADY FORMED) | 45CA |
| PAIR ATTRIBUTE | (00)H : PRIMARY VOL<br>(01)H : SECONDARY VOL | 45CB |
| PAIRED VOLUME'S LUN | LUN OF PAIRED VOLUME<br>※VALID ONLY WHEN RELEVANT VOLUME IS SECONDARY | 45CC |
| SECONDARY LUN NUMBER | 1∼32 | 45CD |
| SECONDARY LUN | LUN OF SECONDARY LUN<br>INITIAL VALUE (FFFF)H: NOT DEFINED<br>※VALID ONLY WHEN RELEVANT VOLUME IS PRIMARY | 45CE |
| MIRROR NUMBER | 0xFFFF : INVALID | 45CF |
| GROUP ID TYPE | 0x01 : GROUP ID VALID<br>0x00 : GROUP ID INVALID | 45CG |
| GROUP ID | 0∼255 | 45CH |
| POOL# | POOL NUMBER FOR USED POOL | 45CI |

| ITEM | DETAIL | |
|---|---|---|
| PAIR STATE | 00 : SMPL···PAIR NOT DEFINED<br>01 : COPY···INITIAL COPY/RESYNCHRONING COPY<br>02 : PAIR···MAINTAINING ASYNCHRONOUS COPY<br>03 : PSUS···SUSPENDED STATE<br>04 : PSUE···SUSPENDED STATE DUE TO FAILURE | 46CA |
| PAIR ATTRIBUTE | 00 : PRIMARY VOL<br>01 : SECONDARY OL | 46CB |
| CT GROUP ID | 0~15 | 46CC |
| PAIRED VOLUME'S LUN | PAIRED VOLUME'S LUN FOR TCE<br>0~2047(M)/4095(H) | 46CD |
| COPY SPEED | 81~85 : SLOW<br>86~8A : REGULAR<br>8B~8F : FAST | 46CE |
| POOL# | POOL NUMBER FOR USED POOL | 46CF |

| ITEM | DETAIL | |
|---|---|---|
| LU NUMBER | LU BELONGING TO POOL | 48CA |
| HEAD POOL FLAG | 0x01 : HEAD<br>0x00 : NOT HEAD | 48CB |
| AFFILIATED POOL VOLUME NUMBER | POOL NUMBER FOR USED POOL | 48CC |

48A(48B)

LOAD EQUALIZING STORAGE CONTROLLER AND CONTROL METHOD FOR THE SAME

CROSS-REFERENCE TO RELATED APPLICATIONS

The present application is a continuation of application Ser. No. 11/968,363, filed Jan. 2, 2008, now U.S. Pat. No. 7,865,676; which relates to and claims priority from Japanese Patent Application No. 2007-142426, filed on May 29, 2007, the entire disclosure of which is incorporated herein by reference.

BACKGROUND OF THE INVENTION

1. Field of the Invention

The invention relates to a storage controller and a control method for the same. More particularly, the invention is suitable for use in a storage controller in which a microprocessor that controls data I/O to/from a host computer includes plural cores (computer engines), and use in a control method for that storage controller.

2. Description of Related Art

Storage controllers create, in storage areas provided by storage devices, logical volumes consisting of a logical area data is input/output to/from, and provide the created logical volumes to a host computer. Each of those controllers includes a controller for controlling data I/O to/from logical volumes according to requests from a host computer.

Conventionally, improvement in the reliability and responsiveness of those storage controllers during processing for commands given from the host computer has been sought for. In recent years, a technique for distributing processing to plural controllers provided in a storage controller has been proposed.

JP-A-9-146842 discloses a technique for having, after one of controllers receives a command, both a processor included in that controller and a processor included in another controller execute processing based on the received command. JP-A-11-312058 discloses a storage controller having dual controllers.

Those patent documents disclose storage controllers having plural identical controllers. Each controller is allocated to a logical volume, and that controller executes data I/O processing or similar for the allocated logical volume. If a controller receives, from a host computer, a command targeting a logical volume other than the logical volume allocated to that controller, the controller requests that a controller allocated to the logical volume executes processing for the command.

Meanwhile, if plural controllers are provided in a storage controller apparatus, even if data I/O requests are issued from a host computer evenly to the controllers, the data I/O processing is executed by a controller allocated to a command target logical volume. Therefore, if the access concentrates on a certain logical volume, the load also concentrates on the controller allocated to that logical volume. The load concentration leads to reduced processing speed in the data I/O processing for the logical volume allocated to the controller.

Also, if plural controllers are provided in a storage controller apparatus as described above and data is copied between logical volumes, different controllers may be allocated respectively to a primary volume (copy source) and a secondary volume (copy destination). If different controllers are allocated respectively to the copy source logical volume and the copy destination logical volume, those controllers have to communicate with each other during copy processing, and therefore, the loads on the controllers increase because of that communication. The increase in the loads on the controllers also leads to reduced processing speed in the data I/O processing for the logical volumes allocated to the controllers.

To prevent the reduced processing speed in data I/O processing, it is necessary to configure settings for allocating an identical controller to both the copy source logical volume and the copy destination logical volume so that the loads do not concentrate in a specific controller. There have been many problems concerning such settings and much effort and time has gone into solving these problems.

The present invention was made in light of the above described problem, and is designed to provide a storage controller and control method that can effectively and easily prevent deterioration in data I/O processing performance caused by load concentration in a specific controller.

SUMMARY OF THE INVENTION

To solve the above problem, the invention provides a storage controller for creating, in a storage area provided by a storage device, plural logical volumes consisting of a logical area data is input/output to/from, providing the created logical volumes to a host computer, and controlling data I/O to/from the logical volumes according to a request from the host computer, the storage controller including: plural control units, each control unit for controlling data I/O to/from a logical volume allocated to that control unit; a load monitor unit for monitoring the state of loads on each control unit; and a changer unit for changing the control unit allocated to logical volumes to another control unit to equalize the loads on the controllers.

The invention also provides a control method for a storage control device for creating, in a storage area provided by a storage device, plural logical volumes consisting of a logical area data is input/output to/from, providing the created logical volumes to a host computer, and controlling data I/O to/from the logical volume according to a request from the host computer, the storage control device having plural control units, each control unit for controlling data I/O to/from a logical volume allocated to that control unit (itself), the method including: a first step of monitoring the state of loads on each control unit; and a second step of changing the control unit allocated to the logical volumes to another control unit to equalize the loads on the control units.

The above described invention can realize a storage controller and control method that can equalize loads on the control units and efficiently and easily prevent deterioration in data I/O processing performance caused by load concentration in specific control units.

BRIEF DESCRIPTION OF THE DRAWINGS

FIG. 3A is a table showing an example of memory space recognized by $0^{th}$ and $1^{st}$ microprocessors; and FIG. 3B is a table showing an example of memory space recognized by $0^{th}$ and $1^{st}$ host communication protocol chips.

FIG. 5 is a conceptual diagram illustrating an allocation management table.

FIG. 6 is a conceptual diagram illustrating an internal copy pair management table.

FIG. 7 is a conceptual diagram illustrating a snapshot copy pair management table.

FIG. 8 is a conceptual diagram illustrating an asynchronous remote copy pair management table.

FIG. 9 is a conceptual diagram illustrating a pool management table.

DETAILED DESCRIPTION OF PREFERRED EMBODIMENTS

An embodiment of the invention will be described below with reference to the drawings.

(1) Storage System Configuration

Figure 1:
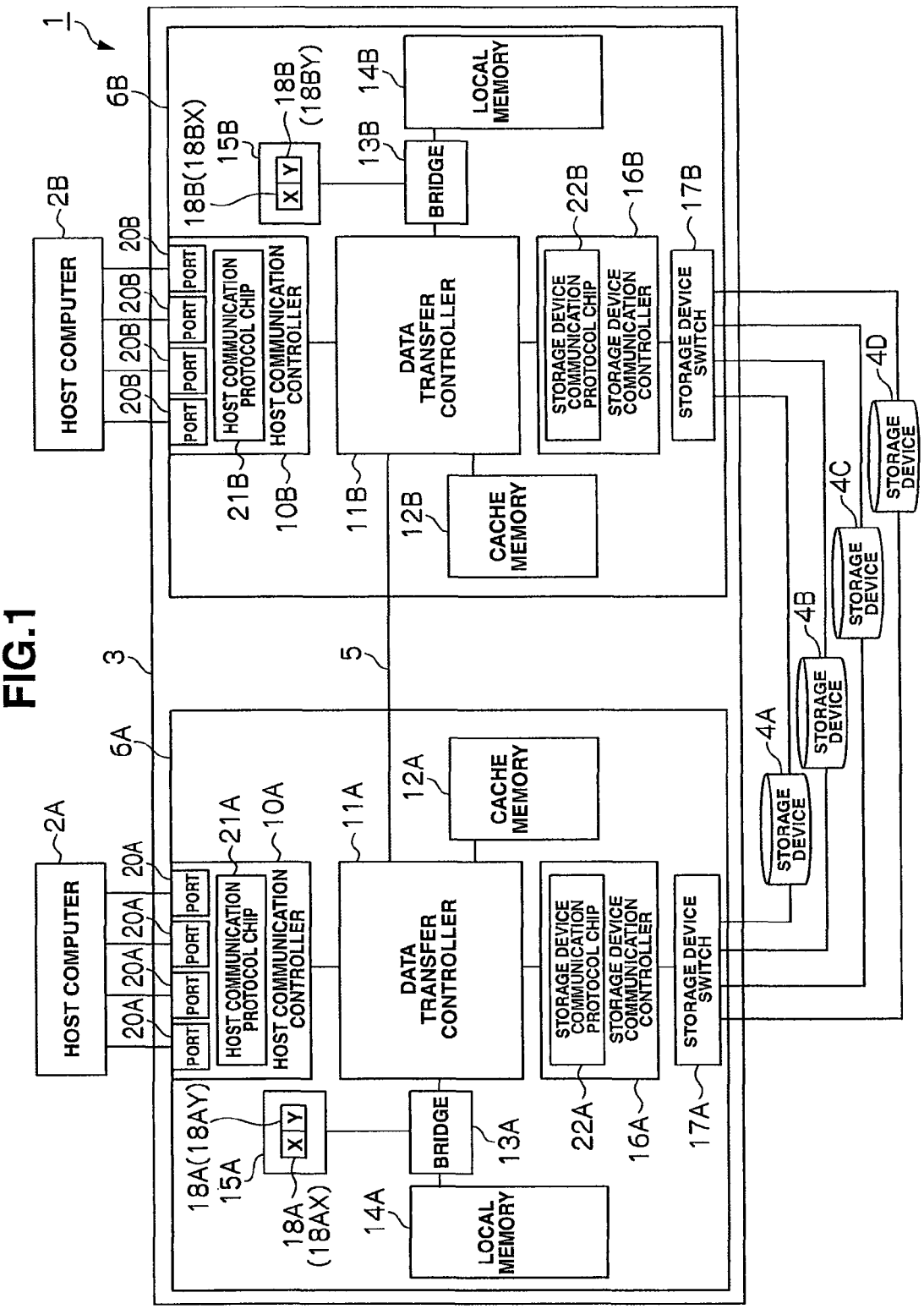
FIG. 1 is a block diagram showing the overall configuration for a storage system according to an embodiment.

FIG. 1 shows a storage system 1 according to this embodiment. In the storage system 1, host computers 2A and 2B are connected, via a storage controller 3, to storage devices 4A-4D.

The host computers 2A and 2B are computers, more specifically personal computers, workstations, mainframes, or similar, having information processing resources such as a CPU (Central Processing Unit) and memory. Each of the host computers 2A and 2B has a communication port (for example, a port provided on a LAN card or a host bus adapter) for accessing the storage controller 3, with which each of the host computers 2A and 2B can send, via that communication port, data I/O request commands to the storage controller 3.

The storage controller 3 includes $0^{th}$ and $1^{st}$ controllers 6A and 6B connected respectively to the different host computers 2A and 2B, and an inter-controller connection 5 that connects the controllers 6A and 6B to each other to permit communication between them.

The inter-controller connection 5 may be a bus that conforms to the PCI (Peripheral Component Interconnect)-Express standard, which uses up to eight lanes and permits rapid data communication at the data transfer amount of 2 G bit/sec per lane. Exchange of all data and commands between the $0^{th}$ and $1^{st}$ controllers 6A and 6B is conducted via the inter-controller connection 5.

The controller 6A (6B) controls data I/O to/from each of the storage devices 4A-4D according to requests from the host computer 2A (2B) connected to the controller 6A (6B). The controllers 6A and 6B respectively include host communication controllers 10A and 10B, data transfer controllers 11A and 11B, cache memories 12A and 12B, bridges 13A and 13B, local memories 14A and 14B, microprocessors 15A and 15B, storage device communication controllers 16A and 16B, and storage device-side switches 17A and 17B, and so on.

The host communication controllers 10A and 10B are interfaces for controlling communication with the host computers 2A and 2B, and respectively include communication ports 20A and 20B and host communication protocol chips 21A and 21B.

The communication ports 20A and 20B are used respectively for connecting the controllers 6A and 6B to a network and to the host computers 2A and 2B. Specific network addresses such as IP (Internet Protocol) addresses or WWNs (World Wide Names) are allocated to each of the communication ports.

The host communication protocol chip 21A (21B) controls communication with the host computer 2A (2B). A host communication protocol chip that conforms to the communication protocol used during communication with the host computer 2A (2B) is used for host communication protocol chips 21A and 21B. For example, the host communication protocol chips 21A and 21B are Fibre Channel (FC) conversion protocol chips if the communication protocol used for communication with the host computers 2A and 2B is FC protocol, or iSCSI protocol chips if the communication protocol is iSCSI protocol.

Each of the host communication protocol chips 21A and 21B has a multiple-CPU feature that enables communication with plural microprocessors. With that feature, the communication protocol chips 21A and 21B can communicate, when necessary, with both the microprocessor 15A in the $0^{th}$ controller 6A and the microprocessor 15B in the $1^{st}$ controller 6B.

The data transfer controllers 11A and 11B control data transfer between the $0^{th}$ and $1^{st}$ controllers 6A and 6B and between components in the $0^{th}$ controller 6A and those in the $1^{st}$ controller 6B, and copies, according to an order from the microprocessor in the same controller, write data sent from the host computer 2A or 2B to designated cache memories 12A and 12B. More specifically, the $0^{th}$ ($1^{st}$) microprocessor 15A (15B) writes, after storing data in the cache memory 12A (12B) in the same controller, that data also to the cache memory 12B or 12A in the other controller (duplicate data write).

When the data transfer controller 11A (11B) updates information in shared area 42A (42B) (FIG. 4), which will be described later, in the local memory 14A (14B) in the same controller, the data transfer controller 11A (11B) also updates the information in the shared area 42B (42A) so that the information stored in the shared areas 42A and 42B is always identical.

The bridges 13A and 13B are intermediate devices that respectively connect the microprocessors 15A and 15B and the local memories 14A and 14B to the data transfer controllers 11A and 11B in the same controller. The bridges 13A (13B) extract only relevant data from data exchanged via buses connecting the host communication controller 10A (10B), the data transfer controller 11A (11B), the storage device communication controller 16A (16B), and the cache memory 12A (12B), and transfer the extracted data to the microprocessor 15A (15B) or the local memory 14A (14B).

The microprocessors 15A (15B) govern the entire operation control in the controller 6A (6B) the microprocessors 15A (15B) belong to. The microprocessor 15A (15B) executes, according to a write/read command held in the local memory 14A or 14B, processing for inputting/outputting data to/from a logical volume that has been exclusively allocated in advance to each microprocessor 15A (15B) (hereinafter referred to as an "allocated logical volume"), as will be described later.

The microprocessors 15A and 15B respectively include cores 18A (18AX, 18AY) and cores 18B (18BX and 18BY). In the example shown in FIG. 1, the microprocessor 15A includes an X core 18AX and a Y core 18YA, and the microprocessor 15B includes an X core 18BX and a Y core 18BY. The core 18A (18B) executes plural software threads in parallel in an appropriate software environment. At least one logical volume in the logical volumes allocated to each microprocessor is allocated to each of the cores 18A and 18B, and the core 18A (18B) handles control of data I/O processing for the logical volumes allocated to that core 18A (18B) itself and other relevant processing.

The allocation of the logical volumes to the cores 18A and 18B can be dynamically changed according to the state of the loads on the cores 18A and 18B, or reception of a command that designates a logical volume and the core to which the processing for that logical volume is allocated (hereinafter referred to as an "allocated core"). That allocation can also be dynamically changed based on whether or not any failure has occurred in the connection between the storage controller 3 and the host computers 2A or 2B, or between the storage controller 3 and each storage device 4A-4B.

The local memories 14A and 14B are used for storing various control programs, and temporarily storing various commands such as read/write commands sent from the host computer 2A or 2B. The microprocessor 15A (15B) processes the read/write commands stored in the local memory 14A (14B) in the order the commands are stored in the local memory 14A (14B). Microprograms for controlling the microprocessors 15A and 15B are stored respectively in the local memories 14A and 15B in the same controllers 6A and 6B.

Figure 2:
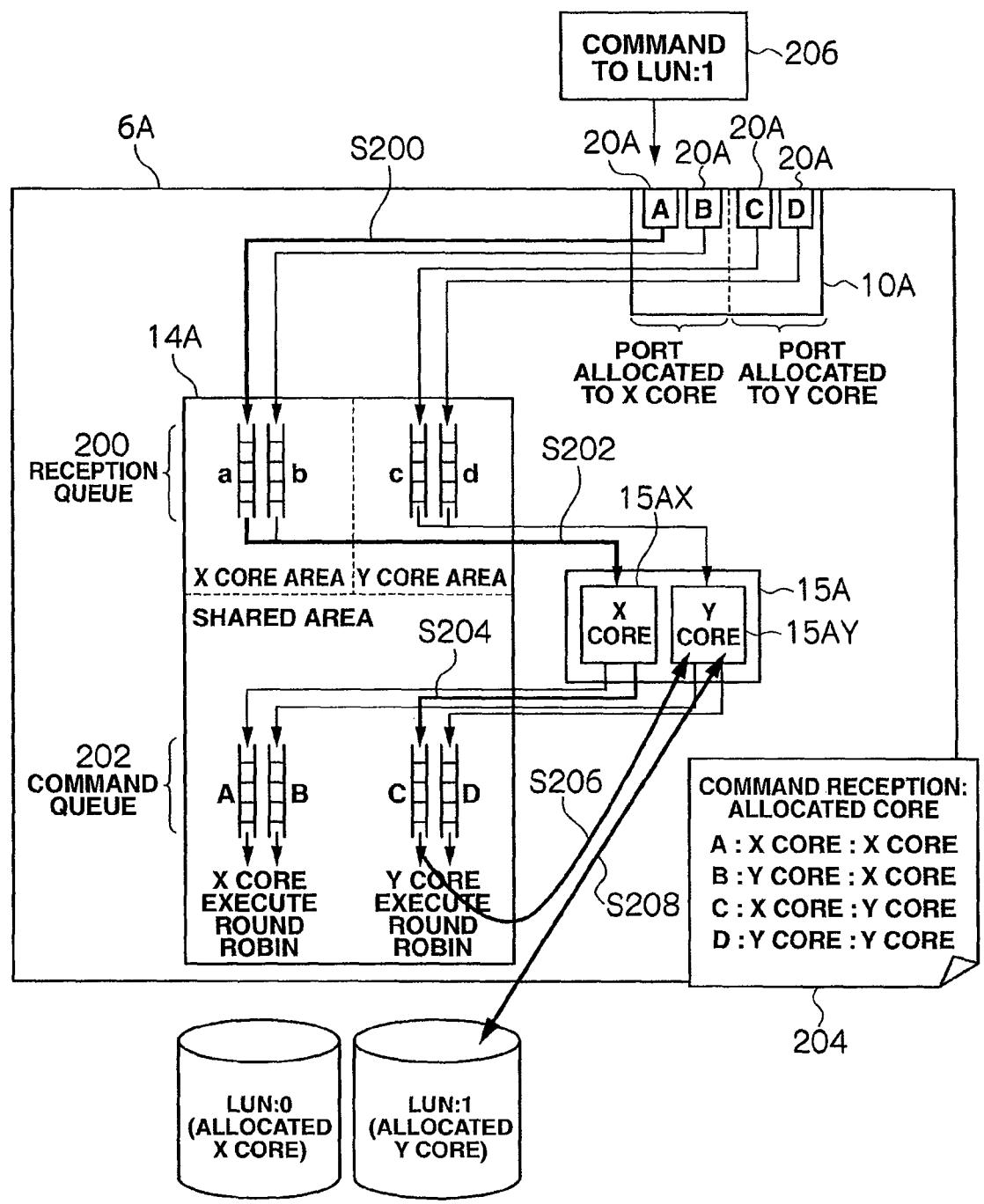
FIG. 2 is a conceptual diagram illustrating a queue structure in a logical memory in a storage controller.

Each of the local memories 14 A and 14B has a queue structure for sequentially processing commands sent from the host computers 2A and 2B, and the queue structure will be described below in detail with reference to FIG. 2. FIG. 2 shows the scheme of the queue structure in the controller 6A. The $1^{st}$ controller 6B, the inter-controller connection 5 connected to the $1^{st}$ controller 6B, and the storage devices 4A-4D are omitted in FIG. 2. The following explanation of the local memory 6A applies to the other local memory 6B.

The queue structure includes reception queues 200 for storing commands from the host computer 2A received by the host communication protocol chip 21A in the host communication controller 10A, and command queues 202 for storing commands to be processed by the X core 18AX or Y core 18AY in the microprocessor 15A.

Each reception queue 200 corresponds to one of the communication ports 20A in the host communication controller 10A, and a command issued by the host computer 2A to a communication port 20A is stored in the reception queue 200 corresponding to that communication port 20A. For example, in FIG. 2, a command issued by the host computer 2A to the communication port "A" 20A is stored in the reception queue "a" 200, a command issued by the host computer 2A to the communication port "B" 20A is stored in the reception queue "b" 200, a command issued by the host computer 2A to the communication port "C" 20A is stored in the reception queue "c" 200, and a command issued by the host computer 2A to the communication port "D" 20A is stored in the reception queue "d" 200. The commands are stored in the reception queues 200 as described above by the host communication protocol chip 21A.

The command stored in each reception queue 200 is processed by the core 18A that has been set as allocated to the communication port 20A corresponding to that reception queue 200. In other words, which core 18A processes a command stored in each reception queue 200 is determined in advance. For example, in FIG. 2, commands stored in the reception queues "A" and "B" 200 are processed by the X core 18AX, and commands stored in the reception queues "C" and "D" 200 are processed by the Y core 18AY. The X core 18AX and Y core 18AY each sequentially read commands from the reception queues 200 corresponding to the communication ports 20A allocated respectively to those X and Y cores, analyze the commands, e.g., check which logical volume LU the command was issued to or which core 18A should execute the command, and store the commands in the relevant command queue(s) 202.

Plural command queues 202 are provided in a single logical volume LU. A command for a logical volume LU is stored in a command queue 202 corresponding to that logical volume LU. In the example shown in FIG. 2, command queues "A" and "B" 202 are provided in the logical volume LU with LUN "0," and commands for that logical volume LU are stored in command queue "A" or "B." The command queues "C" and "D" are provided for the logical volume LU with LUN "1," and the commands for that logical volume LU are stored in command queue "C" or "D." The X core 18AX handles processing for read/write commands for the logical volume LU with LUN "0," and the Y core 18AY handles processing for commands to the logical volume LU with LUN "1."

Which core 18A moves commands to each command queue 202, and which core 18A is allocated for the execution of commands stored in each command queue 202 are decided according to a characteristics table 204 stored in the local memory 14A.

As described above, which core 18A executes command processing is determined for each logical volume LU in this embodiment. Therefore, no contention occurs between the X core 18AX and Y core 18AY for processing for a single logical volume LU, and the X core 18AX and Y core 18AY can independently process I/O access to different logical volumes LU. With that configuration, for example, the situation where contention occurs between two cores 18A for processing for a logical volume LU and the core 18A with the smaller load has to wait for the other core's processing to finish can be avoided. Accordingly, both controllers 6A and 6B, as a whole, can efficiently process commands from the host computer 2A or 2B at a high speed.

Referring back to FIG. 1, the cache memory 12A (12B) is used mainly for temporarily storing data transferred between the host computer 2A (2B) and each storage device 4A-4D, or between the $0^{th}$ and $1^{st}$ controllers 6A and 6B.

The storage device communication controllers 16A and 16B, respectively having storage device communication protocol chips 22A and 22B, are interfaces for controlling communication with each storage device 4A-4D. The storage device communication protocol chips 22A and 22B may be FC protocol chips if FC hard disk drives are used as the storage devices 4A-4D, or SAS protocol chips if SAS hard disk drives are used as the storage devices 4A-4D. If SATA hard disk drives are used as the storage devices 4A-4D, FC protocol chips or SAS protocol chips are used as the storage device communication protocol chips 22A and 22B. Also, if SATA hard disk drives are used as the storage devices 4A-4D, the storage device communication controllers 16A and 16B may be connected to the storage devices 4A-4D via a SATA protocol translation chip.

The storage device-side switches 17A and 17B are switches, which may be SAS-Expanders or FC loop switches, for switching between the storage devices 4A-4D for a communication target. Alternatively, the storage devices 4A-4D may be connected to the controllers 6A and 6B via an FC loop instead of the storage device-side switches 17A and 17B.

Examples of the storage devices 4A-4D include a disk array of hard disk drives, more specifically FC hard disk drives, SAS hard disk drives, or SATA hard disk drives. Plural logical volumes, which are logical storage areas data is written/read to/from, can be set in the storage area provided by the hard disk drives.

Reliability and responsiveness of the logical volumes can be enhanced by utilizing RAID technique for the storage devices 4A-4D. More specifically, various RAID levels, such as "RAID 0," "RAID 1," "RAID 3," "RAID 5," "RAID 6," or "RAID 0+1," can be set for each logical volume.

Storage devices used in the storage devices 4A-4D may also be semiconductor memory such as flash memory, or optical disk devices, instead of hard disk drives. If flash memory is used, any type of flash memory, e.g., a first, inexpensive type with a relatively low writing speed and small restricted write number, or a second, expensive type with a higher writing speed and a larger restricted write number than the first type. Alternatively, the storage devices 4A-4D may include both flash memory of the above described first or second type and hard disk drives at the same time.

Next, command processing executed in the storage controller 3 in the storage system 1 will be described. In the storage system 1, both the memory areas in the $0^{th}$ and $1^{st}$ controllers 6A and 6B are mapped to both memory spaces in the $0^{th}$ and $1^{st}$ controllers 6A and 6B. With that configuration, the $0^{th}$ ($1^{st}$) controller 6A (6B) can also directly access the memory area in the other controller 6B (6A).

The core 18AX (18BX) in the microprocessor 15A (15B) in the $0^{th}$, ($1^{st}$) controller 6A (6B) transfers, after a write/read command targeting a logical volume allocated to the other controller 6B (6A) is sent from the host computer 2A (2B), the read/write command to the other controller 6B (6A) by writing the command to the other controller 6B (6A)'s local memory 14B (14A).

As described above, when a write/read command to be executed by the other controller 6B (6A) is sent from the host computer to the controller 6A (6B) in the storage system 1, the command is transferred by directly writing it to the local memory 16B (16A) in the other controller 6B (6A). Therefore, the $0^{th}$ and $1^{st}$ controllers 6A and 6B do not have to communicate with each other to transfer the write/read command, enabling prompt execution of processing for the write/read commands.

FIG. 3A shows a memory map for the memory space in the controllers 6A and 6B recognized respectively by the $0^{th}$ (CTL0) and $1^{st}$ (CTL1) microprocessors 15A and 15B, and FIG. 3B shows a memory map for the memory space recognized respectively by the $0^{th}$ and $1^{st}$ host communication protocol chips 10A and 10B.

Referring to FIG. 3A, the memory space recognized by the $0^{th}$ microprocessor 15A is memory space consisting of a storage area provided by memory or register stored in the field 30B for "CTL0 Memory Map (CTL0 processor)," i.e., an area within the range of the addresses stored in the "ADR" field, and the memory space recognized by the $1^{st}$ microprocessor 15B is memory space consisting of a storage area provided by the memory or register stored in the field 30C for "CTL1 Memory Map (CTL 1 processor)," i.e., an area within the range of the addresses stored in the "ADR" field 30A.

Referring also to FIG. 3B, the memory space recognized by the $0^{th}$ host communication protocol chip 10A is memory space consisting of a storage area provided by the memory or register stored in the field 31B for "CTL0 Memory Map (CTL0 host communication protocol chip)," i.e., an area within the range of the addresses stored in the "ADR" field 31A, and the memory space recognized by the $1^{st}$ host communication protocol chip 10B is memory space consisting of a storage area provided by the memory stored in the field 31C for "CTL1 Memory Map (CTL1 host communication protocol chip)," i.e., an area within the range of the addresses stored in the "ADR" field 31."

In the data stored in the memory maps shown in FIGS. 3A and 3B, the addresses in the local memory 14 A (14B) (0x0_00000000-0x0_7FFFFFFF) and the addresses in the bridge 13A (13B) (0x0_80000000_0x0_FFFFFFFF) in the same controller 6A (6B) are stored in advance as first address information in flash memory (not shown) connected to the microprocessor 15A (15B). Addresses other than the above in FIG. 3A are stored in advance as second information in a register (not shown) provided in the data transfer controllers 11A (11B) in the same controller 6A (6B).

The microprocessor 15A (15B) and the host communication protocol chip 21A (21B) in $0^{th}$ ($1^{st}$) controller 6A (6B) can recognize the memory space as shown respectively in the memory maps shown in FIGS. 3A and 3B based on the first and second address information stored in the flash memory and register, and can access, based on the recognized memory space, not only the local memory 14A (14B) and the cache memory 12A (12B) in the same controller 6A (6B), but also those in the other controllers.

Figure 4A:
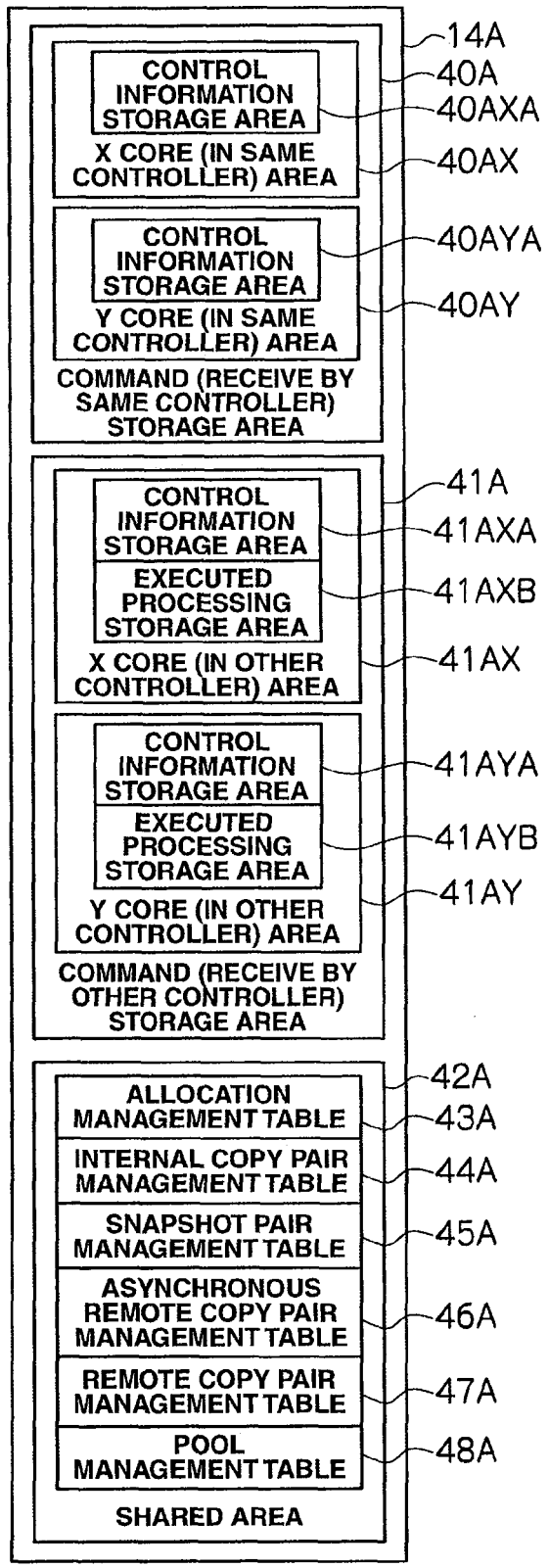
FIG. 4A is a conceptual diagram showing the memory structure of a $0^{th}$ local memory.
Figure 4B:
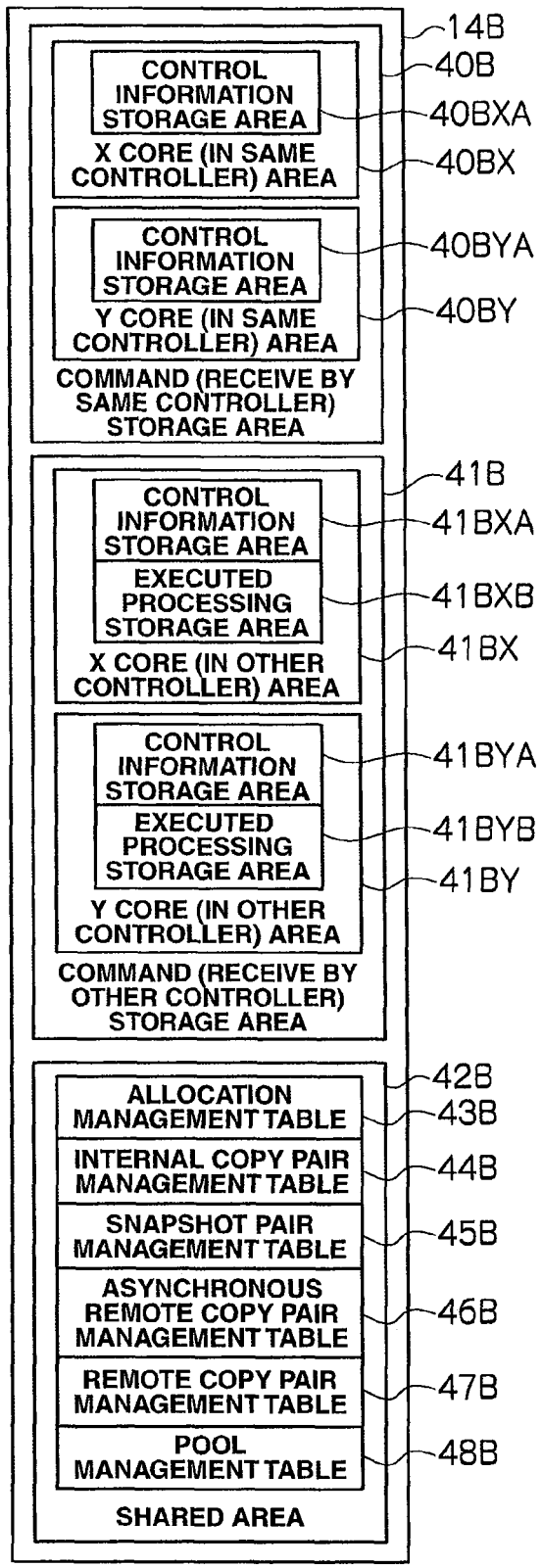
FIG. 4B is a conceptual diagram showing the memory structure of a $1^{st}$ local memory.

FIGS. 4A and 4B show the memory structure in the local memories 14A and 14B in the $0^{th}$ and $1^{st}$ controllers 6A and 6B, respectively. As shown in FIGS. 4A and 4B, the controllers 6A and 6B manage the storage areas in the local memories 14A and 14B by dividing the storage areas into three separate storage areas, i.e., command (received by the same controller) storage areas 40A and 40B, command (received by the other controller) storage areas 41A and 41B, and the shared areas 42A and 42B. The command (received by the same controller) storage areas 40A and 40B are further divided respectively into X core (in the same controller) areas 40AX and 40BX and Y core (in the same controller) areas 40AY and 40BY. The command (received by the other controller) storage areas 41A and 41B are further divided respectively into X core (in the other controller) areas 41AX and 41BX and Y core (in the other controller) areas 41AY and 41BY.

The command (received by the same controller) storage areas 40A and 40B are provided respectively with control information storage area 40AXA and 40BYA in the X core (in the same controller) areas 40AX and 40BX, and the control information storage areas 40AYA and 40BYA in the Y core (in the same controller) areas 40AY and 40BY. Various commands such as read/write commands received by the host communication controller 10A (10B) in the same controller are stored in the control information storage area 40AXA (40 BXA) or 40AYA (4BYA).

The command (received by the other controller) storage areas 41A and 41B are provided respectively with control information storage areas 41AXA and 41BXA in the X core (in the other controller) areas 41AX and 41 BX, and control information storage areas 41AYA and 41BYA in the Y core (in the other controller) areas 41AY and 41BY. Regular commands and control information received by the host communication controller 10B (10A) in the other controller 6B (6A) are stored in the control information storage area 41AXA (41BXA) or 41BXA (41BYA).

The command (received by the other controller) storage areas 41A and 41B are provided respectively with executed processing storage areas 41AXB and 41BXB in the X core (in the other controller) areas 41AX and 41BX, and executed processing storage areas 41AYB and 41BYB in the Y core (in the other controller) areas 41AY and 41BY. When the controller 6A (6B) is allocated for execution of processing for a logical volume that has been previously allocated to the other controller 6B (6A), the content of the processing to be executed after a received command is analyzed in the other controller 6B (6A) and stored in the executed processing storage area 41AXB (41BXB) or 41AYB (41BYB). That processing is executed when the microprocessor 15B (15A) in the other controller 6B (6A) is down due to a failure, or in similar situations.

The shared areas 32A and 32B respectively store allocation management tables 43A and 43B, internal copy pair management tables 44A and 44B, snapshot pair management tables 45A and 45B, asynchronous remote copy pair management tables 46A and 46B, remote copy pair management tables 47A and 47B, and pool management tables 48A and 48B. Those tables will be described later in detail.

(2) Load Dispersion Feature (2-1) Configurations for Various Tables

Next, a feature for dispersing loads in the storage controller 3 will be described. In this embodiment, the storage controller 3 has a first feature for dispersing loads by changing, to a single core 18A or 18B, cores allocated to logical volumes that relate to each other and therefore should be allocated to a single core 18A or 18B, e.g. logical volumes that form a copy pair to a single core 18A or 18B. In the case of logical volumes that form a copy pair, cores allocated to those logical volumes are changed to a single core 18A or 18B.

In this embodiment, the storage controller 3 also has a second feature for dispersing loads by monitoring the states of the loads on the cores 18A and 18B in the microprocessors 15A and 15B in the controllers 6A and 6B, and changing a core 18A (18B) with a higher load allocated to a logical volume to another core 18A (18B) with a lower load in order to equalize the loads on the cores 18A and 18B. When doing so, the storage controller 3 also changes, to a single core 18A or 18B, cores allocated to logical volumes that relate to each other and should be allocated to a single core 18A or 18B, as in the first load distribution feature.

As means for realizing the first and second load distribution features, the allocation management tables 43A and 43B, the internal copy pair management tables 44A and 44B, the snapshot pair management tables 45A and 45B, the asynchronous remote copy pair management tables 46A and 46B, the remote copy pair management tables 47A and 47B, and the pool management tables 48A and 48B are respectively stored in the shared areas 42A and 42B in the local memories 14A and 14B in the controllers 6A and 6B in the storage controller 3.

The allocation management tables 43A and 43B are tables for managing the controller 6A (6A) and core allocated to each logical volume created in the storage devices 4A-4D, and are prepared every time a logical volume is created. Each core 18A (18B) knows from the allocation management table 43A (43B) whether a logical volume is allocated to itself or not.

As shown in FIG. 5, the allocation management table 43A (43B) includes an 'allocated controller' entry 43CA and an 'allocated core' entry 43CB. The 'allocated controller' entry 43CA stores the identification number provided for the controller 6A (6B) allocated for the execution of processing based on commands such as read/write commands (command processing) for the relevant logical volume (hereinafter referred to as an "allocated controller"). The 'allocated core' entry 43CB stores the identification number provided for the core 18A (18B) allocated to the relevant logical volume included in the microprocessor 15A (15B) in the above allocated controller.

The internal copy pair management tables 44A and 44B are tables for managing pairs of logical volumes between which internal copy is executed (hereinafter referred to as "internal copy pair(s)"), and are prepared for each logical volume. The "internal copy" means data copy executed between logical volumes formed in the same storage device 4A-4D. As shown in FIG. 6, the internal copy pair management tables 44A and 44B include a 'pair state' entry 44CA, 'pair attribute' entry 44CB, 'paired volume's LUN' entry 44CC, 'mirror number' entry 44CD, 'copy speed' entry 44CE, 'group type' entry 44CF, 'group ID' entry 44CG, and 'secondary LUN' entry CH.

The 'pair state' entry 44CA stores a code indicating the pair state in a copy pair including the relevant logical volume. The pair states include a state where the internal copy pair including the relevant logical volume has not been defined ("SMPL"), a state where initial copy or resynchronizing copy is being executed ("COPY"), a state where data content in a primary volume matches that in a secondary volume in an internal copy pair ("PAIR"), and a state where data content in a primary volume is not reflected in a secondary volume in an internal copy pair ("PSUS").

The 'pair attribute' entry 44CB stores a code indicating the pair attribute (primary/secondary) of the relevant logical volume. The 'paired volume's LUN' entry 44CC stores the logical volume number of the primary volume if the relevant logical volume is set as a secondary volume in an internal copy pair. The 'paired volume's LUN' entry 44CC cannot be referred to if the relevant logical volume is set as a primary volume.

In this embodiment, up to eight secondary volumes can be set for an internal copy pair, and the order of those secondary volumes is stored in the 'mirror number' entry 44CD. The 'copy speed' entry 44CE stores a code indicating the speed set as a copy speed used during initial copy or resynchronizing copy in the internal copy.

Also, in this embodiment, several internal copy pairs can be set as a single group. The 'group type' entry 44CF stores a code indicating whether the group setting is valid/invalid. If the relevant logical volume belongs to any of the groups, an ID provided for that group is stored in the 'group ID' entry 44CG.

Values stored in the 'mirror number' entry 44CD, 'copy speed' entry 44CE, 'group type' entry 44CF, and 'group ID' entry 44CG are valid only when the relevant logical volume is set as a secondary volume in an internal copy pair.

If the relevant logical volume is set as a primary volume, the 'secondary LUN' entry 44CH stores the logical volume number for the secondary volume. As described above, in this embodiment up to eight secondary volumes can be set for an internal copy pair, and the 'secondary LUN' entry 44CH stores the logical volume number for the logical volumes set as the secondary volumes.

Meanwhile, snapshot pair management tables 45A and 45B are tables for managing pairs of logical volumes and pool volumes for storing snapshot data (pre-update data) for those logical volumes (hereinafter referred to as "snapshot pair(s)"), and are prepared for each logical volume. As shown in FIG. 7, the snapshot pair management tables 45A and 45B include a 'pair state' entry 45CA, 'pair attribute' entry 45CB, 'paired volume's LUN' entry 45CC, 'secondary LU' entry number' 45CD, 'mirror number' entry 45CF, 'group ID type' entry 45CG, 'group ID' entry 45CH, and 'pool volume number' entry 45CI.

The 'pair state' entry 45CA stores a code indicating the pair state of a snapshot pair including the relevant logical volume. The 'pair attribute' entry 45CB stores a code indicating the pair attribute (primary/secondary) of the relevant logical volume if the relevant logical volume and another logical volume are set as a snapshot pair.

The 'paired volume's LUN' entry 45CC stores, if the relevant logical volume is set as a secondary volume (i.e., a pool volume) of a snapshot pair, the logical volume number for its primary volume. The 'paired volume's LUN' entry 45 CC cannot be referred to if the relevant logical volume is a primary volume of a snapshot pair.

The 'secondary LU number' entry 45CD stores the number of secondary volumes (i.e., pool volumes) with which the relevant logical volume forms a snapshot pair. In this embodiment, up to thirty-two logical volumes can be set as secondary volumes of a snapshot pair. The 'secondary LUN' entry 45CE stores the logical volume number for secondary volume(s) with which the relevant logical volume forms a snapshot pair. The "secondary LUN" entry 45CE can be referred to only when the pair attribute of the relevant logical volume is "primary."

The 'mirror number' entry 45CF stores, if the relevant logical volume is a secondary volume of the snapshot pair, the number indicating its position of the secondary volumes. In this embodiment, plural snapshot pairs can be set as a single group, and the 'group ID type' entry 45CG stores a code indicating whether the group setting is valid/invalid. If the relevant logical volume belongs to any such group, the 'group ID' entry 45CH stores the ID provided for that group.

The 'pool number' entry 4501 stores, if the relevant logical volume is a primary volume of a snapshot pair, the pool volume number that is an identification number for the secondary volume (pool volume). This 'pool number' entry 45CI can be referred to only when the relevant logical volume is a primary volume of a snapshot pair.

The asynchronous remote copy pair management tables 46A and 46B are tables for managing pairs of logical volumes between which asynchronous remote copy is conducted (hereinafter referred to as "asynchronous remote copy pairs"), and are prepared for each logical volume. "Asynchronous remote copy" is a method for copying data between primary and secondary volumes asynchronously with data write from the host computer to the primary volume. In that method, the primary and secondary storage devices 4A-4D regularly create snapshots of the respective primary and secondary volumes.

The asynchronous remote copy pair management tables 46A and 46B respectively include 'pair state' entry 46CA, 'pair attribute' entry 46CB, 'consistency group ID' entry 4600, 'paired volume's LUN' entry 46CD, 'copy speed' entry 46CE, and 'pool number' entry 46CF.

The 'pair state' entry 46CA stores a code indicating the pair state of an asynchronous remote copy pair including the relevant logical volume. The 'pair attribute' entry 46CB stores, if the relevant logical volume and another logical volume are set as an asynchronous remote copy pair, a code indicating the pair attribute of the relevant logical volume (primary/secondary).

The 'consistency group ID' entry 46CC stores an identification number (consistency group number) provided for a consistency group including the relevant logical volume. The "consistency group" is a group of plural logical volumes each storing associated data, such as a group of a logical volume storing content data for a database, a logical volume storing search data for the database, and a logical volume storing log data for the database.

The 'paired LUN' entry 46CD stores, if the relevant logical volume is set as a secondary volume of an asynchronous remote copy pair, the logical volume number for the primary volume. The 'copy speed' entry 46CE stores a code indicating the speed set as the copy speed used during initial copy or resynchronizing copy in the asynchronous remote copy. The 'pool volume number' entry 46CR stores the pool volume number for a pool volume for storing the data of a snapshot of the relevant logical volume.

The remote copy pair management tables 47A and 47B are tables for managing pairs of logical volumes between which remote copy is executed (hereinafter referred to as "remote copy pair(s)"), and are prepared for each logical volume. "Remote copy" is a method for copying data written to a primary logical volume set in a primary storage device 4A-4D to a secondary volume set in a secondary storage device 4A-4D synchronously with data write from the host computer to the primary volume. In that method, the primary and secondary storage devices 4A-4D regularly create snapshots of the respective primary and secondary volumes.

The remote copy pair management tables 47A and 47B have the same configuration as the asynchronous remote copy pair management tables 46A and 46B, so their explanation has been omitted.

The pool management tables 48A and 48B are tables for managing logical volumes that form a pool volume, and are prepared for each logical volume belonging to a pool volume. As shown in FIG. 9, the pool management tables 48A and 48B respectively include a 'logical volume number' entry 48CA, 'head pool flag' entry 48CB, and 'affiliated pool volume number' entry 48CC.

The 'logical volume number' entry 48CA stores the logical volume number for each of the relevant logical volumes that belong to a pool volume. The 'head pool flag' entry 48CB stores a code indicating whether or not the relevant logical volume is a volume the head address of the pool volume is allocated to. The 'affiliated pool volume number' entry 48CC stores the pool number for the pool volume the relevant logical volume belongs to.

(2-2) Processing Executed by Core Relating to First Load Dispersion Feature

Figure 10:
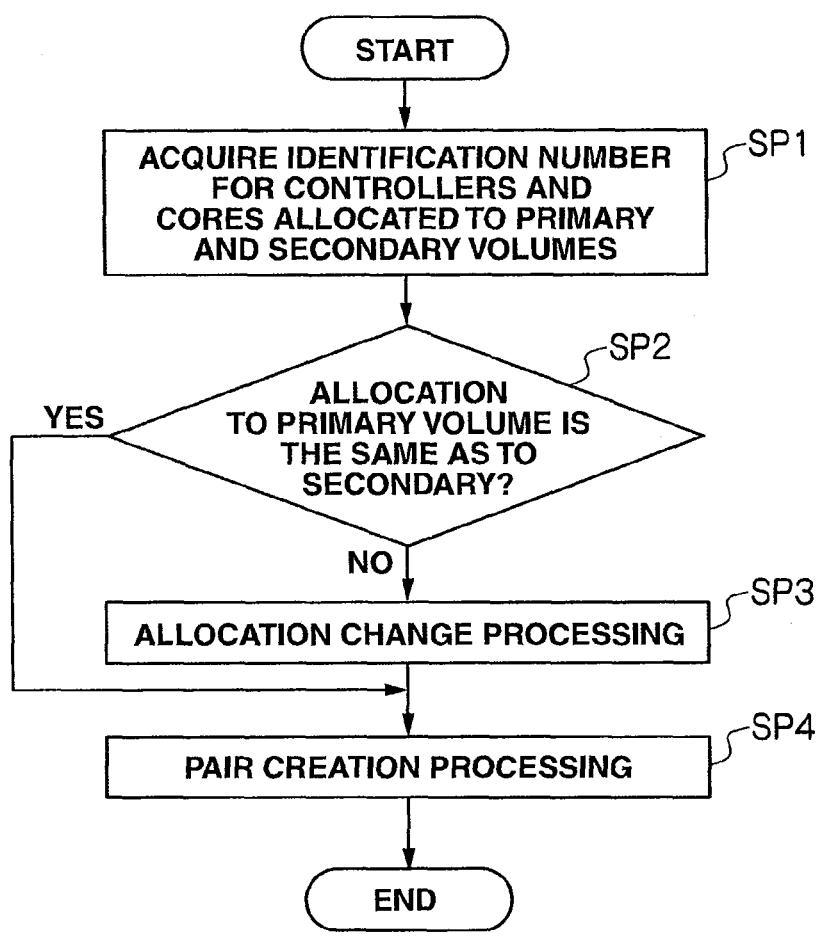
FIG. 10 is a flowchart illustrating first processing for distributing loads.

FIG. 10 shows the specific content of the processing executed by each of the cores 18A and 18B relating to the above described first load distribution feature.

The core 18A (18B) starts, after a command to create an internal copy pair, snapshot pair, remote copy pair, or asynchronous remote copy pair is given from the host computer 2A (2B), processing for creating a pair, as shown in FIG. 10, based on the relevant control program stored in the local memory 14A (14B), and first refers to the allocation management tables 43A (43B) for the primary and secondary volumes and acquires the identification numbers for the controllers 6A (6B) and cores 18A (18B) allocated respectively to the primary and secondary volumes (SP1).

Subsequently, the core 18A (18B) checks whether or not the controllers and cores allocated to the primary and secondary volumes have to be changed (SP2). More specifically, if the pair creation command is intended for creation of an internal copy pair, the core 18A (18B) checks whether or not the core 18A (18B) allocated to the primary volume is the same as the core 18A (18B) allocated to the secondary volume. If the pair creation command is intended for creation of a snapshot pair, the core 18A (18B) checks whether or not the core 18A (18B) allocated to the primary volume is the same as the core 18A (18B) allocated to the secondary pool volume for storing the snapshot data. If the pair creation command is intended for creation of an asynchronous remote copy pair or a remote copy pair, the core 18A (18B) checks whether or not that core 18A (18B) itself allocated to the primary or secondary volume is the same as the core 18A (18B) allocated to a pool volume for storing the snapshot data for the relevant logical volume.

If the check result is "YES," the processing proceeds to step SP4. If the check result is "NO," the core 18A (18B) allocated to the relevant primary (or secondary) volume is changed to the core 18A (18B) allocated to the secondary (or primary volume) (SP3).

More specifically, if the pair creation command is intended for an internal copy pair, the core 18A (18B) changes the controller 6A (6B) and core 18A (18B) allocated to the secondary volume stored in the allocation management table 43A (43B) (FIG. 5) to the controller 6A (6B) and core 18A (18B) allocated to the primary volume. If the pair creation command is intended for creation of a snapshot pair, the core 18A (18B) changes the controller 6A and core 18A (18B) allocated to the primary volume stored in the allocation management tables 43A and 43B to the controller 6A (6B) and core 18A (18B) allocated to the secondary pool volume. If the pair creation command is intended for creation of an asynchronous remote copy pair or remote copy pair, the core 18A (18B) changes the allocation of the controller 6A (6B) and core 18A (18B) allocated to the primary/secondary volume to which the core 18A (18B) itself is currently allocated, to the controller 6A (6B) and core 18A (18B) allocated to the pool volume for storing the snapshot data for the relevant logical volume.

After that, the core 18A (18B) executes predetermined processing for forming the pair, like controlling the relevant storage device 4A-4D to copy the data in the primary volume to the secondary volume (in the case of the internal copy pair), and terminates the pair creation processing.

(2-3) Processing Executed by Core Relating to Second Load Dispersion Feature

Figure 11:
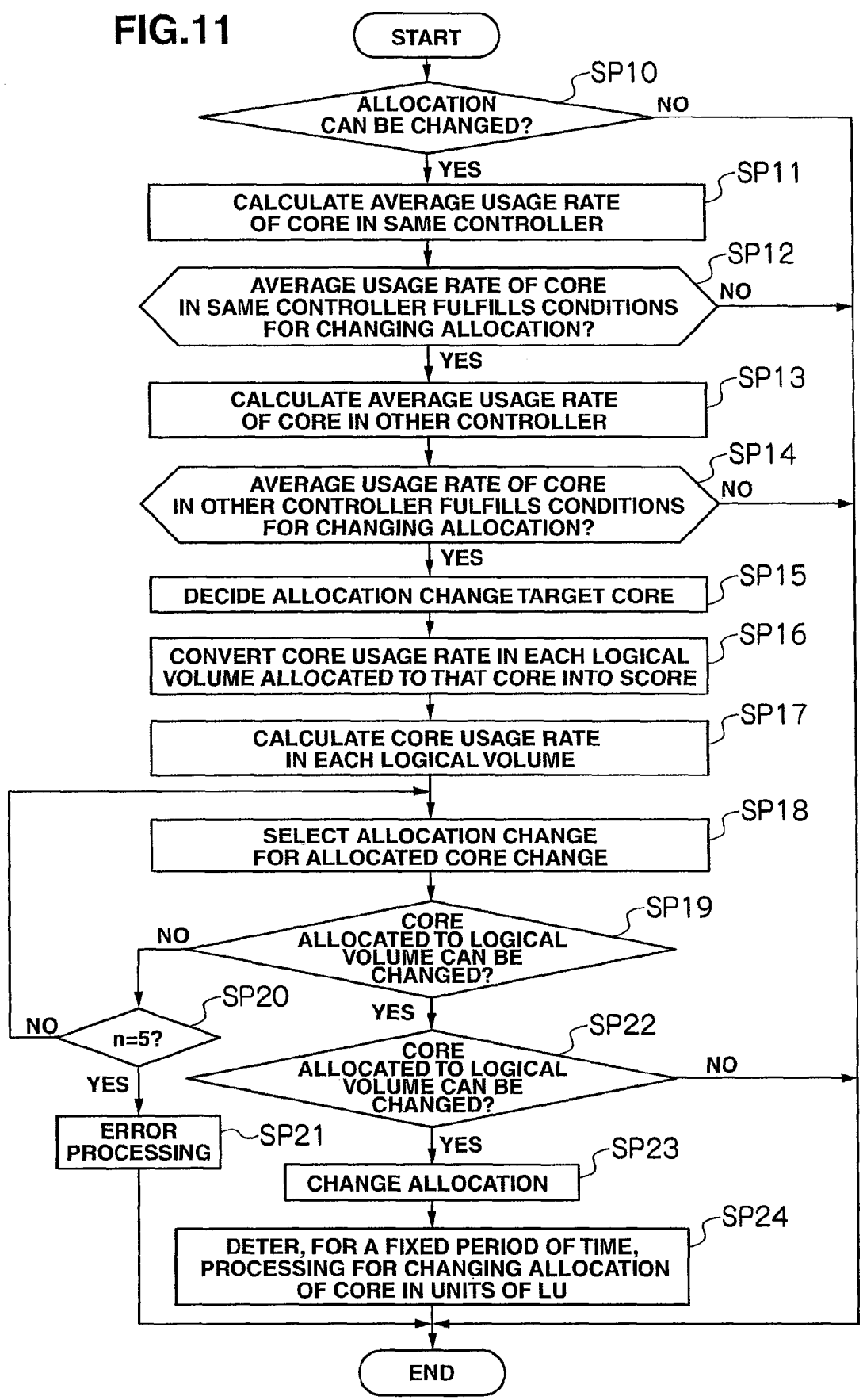
FIG. 11 is a flowchart illustrating second processing for distributing loads.

FIG. 11 is a flowchart illustrating the specific content of processing executed by each of the cores 18A and 18B relating to the above described second load dispersion feature. The core 18A (18B) periodically (hereinafter every 5 seconds) executes the second load dispersion processing, as shown in FIG. 11, based on the relevant control program stored in the local memory 14A (14B).

In practice, the core 18A (18B) starts the second load dispersion processing, and first checks whether or not the storage system 1 fulfills the prior conditions for changing the allocation so that the logical volume allocated currently to that core 18A (18B) itself is allocated to another core 18A (18B) (SP10).

In this embodiment, the prior conditions include: all settings of performance monitor for monitoring target items being available (i.e., settings being configured to acquire performance data for all target items); and one minute not having passed since changing the allocation of the core 18A (18B) to any logical volume, or similar. The former condition is necessary because all target items have to be monitored before executing the load dispersion processing, and the latter condition is necessary because, if the core 18A (18B) allocated to logical volumes is frequently changed, the performance may adversely deteriorate due to overhead generated during the processing for changing the allocation of the core 18A (18B). The performance monitor is processing for monitoring data I/O performance constantly executed by the microprocessor 15A (15B) in the same controller. The performance monitor target items include the number of data inputs/outputs per second to/from each logical volume allocated to the core 18A (18B) in the microprocessor 15A (15B) in the same controller (IOPS), and the usage rate of each core 18A (18B) in the microprocessor 15A (15B) in the same controller per second (=processing time/monitor time).

If the check result in step SP10 is NO, the core 18A (18B) terminates the second load dispersion processing. Meanwhile, if the check result in step SP10 is YES, the core 18A (18B) acquires data for the state of a load on that core 18A (18B) itself from the performance data concerning the target items acquired by the performance monitor, and converts the state of the load on that core 18A (18B) itself into a numerical value based on the above acquired data (SP11). More specifically, the core 18A (18B) executes calculation for the previous three minutes by averaging, every five seconds, the usage rate of that core 18A (18B) itself per second acquired by the performance monitor (the thus calculated value will be hereinafter referred to as the "average usage rate").

After that, the core 18A (18B) judges whether or not the average usage rate of that core 18A (18B) itself for the previous three minutes calculated in step SP11 fulfills predetermined first conditions for changing the allocation (SP12). In this embodiment, the first conditions for changing the allocation include: eight or more of the total of thirty-six average usage rates of that core 18A (18B) itself every five seconds for the previous three minutes being not less than 80%; the average usage rates of that core 18A (18B) itself in all one minute periods in the previous three minutes not exceeding 80%; and the average of the average usage rates of that core 18A (18B) itself in every 5 seconds for the previous three minutes being not less than 70%.

If the average usage rates of the core 18A (18B) every five seconds for the previous three minutes fulfill none of the first conditions for changing the allocation, the core 18A (18B) terminates the second load dispersion processing.

Meanwhile, if the average usage rates of the core 18A (18B) every five seconds for the previous three minutes fulfill at least one of the first conditions for changing the allocation, the core 18A (18B) determines, for changing the allocation, a core 18A (18B) to which the logical volume allocated that core 18A (18B) itself is to be allocated next, from the other cores, which also include the cores 18B (18A) included in the microprocessor 15B (15A) in the other controller 6B (6A) (SP13-SP15).

More specifically, the core 18A (18B) first calculates the average usage rate of each of the other cores (including the other cores 18A (18B) in the same processor) every five seconds for the previous three minutes, like in step SP11 (SP13).

Subsequently, the core 18A (18B) checks whether or not any of the cores 18A and 18B fulfills the predetermined second change conditions (SP14). In this embodiment, the second change conditions include: no average usage rate of the core 18A (18B) every five seconds for the previous three minutes reaching 80%; and the average of the average usage rates of the core 18A (18B) every five seconds for the previous three minutes being not more than 40%.

If any of the other cores 18A and 18B fulfills all of the second conditions for changing the allocation, the core 18A (18B) selects the core 18A (18B) that fulfills the second conditions as the destination for the allocation of the core to the relevant logical volume (SP15).

If several other cores 18A (18B) fulfill all of the second conditions for changing the allocation in step SP14, priority is given to the other cores 18A (18B) in the same controller 6A (6B) when setting the destination for the allocation change, because overhead generated due to the allocation change between the cores 18A (18B) in the same controller is smaller than that generated due to the allocation change between cores in different controllers. Meanwhile, if no core fulfills all of the second conditions for changing the allocation, the core 18A (18B) chooses, as the destination for the allocation change, the core 18B (18A) with the lowest average usage rates every five seconds in the previous three minutes from the cores 18B (18A) in the microprocessor 15B (15A) in the other controller 6B (6A). That is because more loads can be dispersed by setting the core 18B (18A) with the lowest average usage rates as the destination of the allocation change.

Subsequently, the core 18A (18B) selects, from the logical volumes allocated to that core 18A itself, a candidate logical volume for allocated core change to the core selected in step SP15 (SP16-SP19).

The above candidate may conceivably be selected by using a method calculating the usage rate of the core 18A (18B) for each of the logical volumes allocated to the relevant core 18A (18B) (=(processing time for each logical volume/monitoring time)) (hereinafter referred to as a "core usage rate") and choosing the logical volume with the largest core usage rate. However, acquiring a core usage rate in each logical volume is difficult in the present circumstances. Also, additional processing for acquiring information becomes necessary for the above method in many cases, resulting in reduced performance.

Therefore, for selecting the candidate logical volume, this embodiment employs a method currently used by the performance monitor, i.e., calculating an approximate value for the core usage rate in each logical volume allocated to the core 18A (18B) from a proportion of the number of data inputs/outputs per second to/from each logical volume (SP16, SP17).

More specifically, the core 18A (18B) converts, based on the following formula, the core usage rate in each logical volume allocated to that core 18A (18B) itself into a score (SP16):

$$\text{SCORE} = Rm + Rh \times Th + W \times Tx \quad (1)$$

In formula (1), Rm is the average value of the number of times data stored in the logical volume (i.e., the read target data not having been stored in the cache memory 12A (12B)) is misread per second for the past one minute; Rh is the average value of the number of read hits (i.e., the read target data having been stored in the cache memory 12A (12B)) per second for the past one minute; W is the average value of the number of times data has been written to the relevant logical volume per second for the past one minute; Th is a read hit overhead coefficient; and W is a write overhead coefficient.

In this embodiment, Th is set to 0.3. Tw is a value that depends on the RAID level formed in the storage devices 4A-4D or the pair state of the copy pair including the relevant logical volume. For example, Tw is set to 2.5 if the RAID level is "1," 5 if the RAID level is "5," or 1 if the RAID level is "0." However, if the relevant logical volume is a primary volume of an internal copy pair, remote copy pair, or asynchronous remote copy pair, and if the pair state of that internal copy pair, remote copy pair, or asynchronous remote copy pair is the state where the data in the primary volume matches the data in the secondary volume ("PAIR"), Tw is a value obtained by multiplying the above values by 2, 1.5, or 4, respectively. Meanwhile, if the logical volume is a primary volume of a snapshot copy pair and the pair state of that snapshot copy pair is the "SPLIT" state ("PSUS"), Tw is a value obtained by multiplying the above values by 4.

Subsequently, the core 18A (18B) calculates, based on the scores calculated in step SP16, the core usage rate in each logical volume from the scores for those logical volumes and the total usage rate of that core 18A (18B) itself (SP17).

After that, the core 18A (18B) selects, based on the core usage rate in each logical volume acquired as described above, the logical volume for allocated core change (SP18). More specifically, the core 18A (18B) chooses the logical volume that fulfills the requirement (hereinafter referred to as a "target logical volume selection requirement") that the core usage rate in the logical volume is closest to half of a difference between the core usage rate of the core that has been allocated to the logical volume and the core usage rate of the core to be the destination of the allocation change for the past one minute, so that the core usage rate of the previously allocated core becomes almost the same as the core usage rate of the core to be the allocation change destination.

For the above selection, the core 18A (18B) refers to the entries corresponding to the relevant logical volume in the internal copy pair management tables 44A (44B) (FIG. 6), the snapshot pair management tables 45A (45B) (FIG. 7), the asynchronous remote copy pair management tables 46A (46B) (FIG. 8), or the remote copy pair management tables 48A (48B) (FIG. 4), checks whether or not the relevant volume forms an internal copy pair, snapshot pair, asynchronous copy pair, or remote copy pair, and also checks whether or not the logical volume forms a consistency group.

If the relevant logical volume forms any of those copy pairs or forms a consistency group, the volumes allocated to the relevant logical volume, such as the other party of the copy pair, the other logical volume(s) included in the consistency group, or other logical volume(s) mapped to a pool volume if the other party is a pool volume, are set as a logical volume group. The core 18A (18A) chooses the logical volume group that fulfills the target logical volume selection requirement.

However, even if a logical volume or a logical volume group fulfills the target logical volume selection requirement, if any cross logical volume within ±3% (a logical volume that receives read/write commands, 90% of which comes from the controller 6B (6A) not allocated to that logical volume) exist, the non-allocated controller 6B (6A) has to be changed to the associated controller at first. Therefore, a closest cross logical volume is selected from the cross logical volumes.

After that, the core 18A (18B) checks whether or not the core allocated to the logical volume or all volumes in the logical volume group selected in step SP18 can be changed to the core 18A (18B) selected in step SP15 (SP19). More specifically, in this embodiment, the core allocated to a logical volume(s) cannot be changed if the usage rate of the allocation change destination core 18A (18B) after core allocation change for the logical volume or all volumes in the logical volume group becomes −10% or more of the usage rate of the originally allocated core 18A (18B). The reason is that if the usage rate of the originally allocated core 18A (18B) is 70%, the usage rate of the allocation change destination core 18A (18B) is 40%, and the logical volume/logical volume group with its core usage rate (in the case of a logical volume group, the core usage rate of the entire group) of 30% is selected as the allocation change target logical volume/logical volume group, the load balance remains poor even after changing the allocation.

If the result of the check in step SP19 is NO, the core 18A (18B) checks whether or not a fifth candidate has already been selected (SP20). If the result in step SP20 is NO, the same processing (SP18-SP20-SP18) is repeated a maximum of five times. The reason for setting the maximum number of times is that the processing time becomes long if the same processing is repeated more than five times, and with that maximum number of times the processing time can be prevented from becoming long. The maximum number of times may be a number other than five. If the logical volume/logical volume group that fulfills the allocation change conditions cannot be selected even after repeating the processing in steps S18-S20 five times, the core 18A (18B) assumes that no logical volume/logical volume group to be an allocation change destination exists, executes predetermined error processing (SP21), and terminates the second load dispersion processing.

Meanwhile, if an allocation change destination logical volume/logical volume group is selected via the processing in steps SP18-SP20, the core 18A (18B) checks whether or not the core allocated to the selected logical volume/logical volume group can be changed to the core 18A (18B) selected in step SP15 (SP22).

For example, the allocation cannot be changed during allocation change deterrent time, which will be described later in relation to step SP24, so the check result in step S22 is NO in that case. Therefore, the core 18A (18B) does not change the allocation and terminates the second load dispersion processing.

Meanwhile, if the check result in step SP22 is YES, the core 18A (18B) changes the allocation. More specifically, the core 18A (18B) replaces, with the codes for the core 18A (18B) selected in step SP15 and for the controller 6A (6B) having the microprocessor 15A (15B) including that core 18A (18B), the codes stored respectively in the 'allocated core' entry 43CA and the 'allocated controller' entry 43CB corresponding to the relevant logical volume or each logical volume included in the relevant logical volume group in the allocation management tables 43A (43B) stored in the shared area 42A (42B) in the local memory 14A (14B) in the controller 6A (6B). At the same time, the core 18A (18B) updates the allocation management table 43B (43A) stored in the shared memory 42B (42A) in the local memory 14B (14A) in the other controller 6B (6A).

After that, the core 18A (18B) configures settings with respect to all cores 18A and 18B in the storage controller 3 for deterring, for a fixed period of time (hereinafter referred to as "allocation change deterrent time"), the above described processing for changing the allocation of the cores to a logical volume (SP24), and terminates the second load dispersion processing.

(3) Command Issue Allocation Feature

Next, a command issue allocation feature, which is another characteristic feature provided to the controllers in the storage controller in this embodiment, will be described.

When remote copy is conducted in a conventional storage controller having plural controllers, both processing for controlling the storage device 4A-4D that functions as an initiator (i.e., issues commands) and processing for controlling the storage device 4A-4D that functions as a target (i.e., receives commands) are executed. In a conventional storage controller, issue of SCSI commands in the processing for controlling the initiator storage device 4A-4D is conducted by a controller (more specifically, a core) allocated to a primary volume, and issue of other link service-related commands is conducted by a controller (more specifically, a core) allocated to a communication port 20A used when sending those commands to the target storage device 4A-4D.

However, in the storage system 1 in this embodiment, SCSI commands can be issued via a communication port 20A allocated to a controller 6A (6B) that is not allocated to the primary logical volume, and such a cases can actually exist due to the influence of loads or failures.

In that case, if commands issued in relation to SCSI commands are also issued by the controller 6A (6B) allocated to the communication port 20A used for sending those commands, and if the controller 6B (6A) allocated to the primary volume differs from the controller 6A (6B) allocated to the communication port 20A that issues the commands, those controllers 6A and 6B have to communicate with each other to transfer the commands. In that case, loads are generated on the controllers 6A and 6B due to that communication.

To address that problem, the storage controller in this embodiment has a command issue allocation feature, with which, of link service-related commands, the commands issued in relation to SCSI commands are issued by the controller 6A (6B) allocated a primary volume, and other link service-related commands (in particular, commands relating to processing executed for each port) are issued by the controller 6B (6A) allocated to the communication port 20A used when sending those commands to the target storage device 4A-4D.

More specifically, for example, an ABTS (Abort Sequence) command used for having the target storage device 4A-4D forcefully terminate processing based on an issued SCSI command when a timeout occurs, or in other similar occasions, is issued by the controller 6A (6B) allocated to a primary volume. Meanwhile, issue of a PLOGI (Port Log In) command used for resetting the communication port 20A corresponding to the target storage device 4A-4D when timeout repeatedly occurs even after the ABTS command is issued, or in other similar occasions, is issued by the controller 6B (6A) allocated to the communication port 20A used when sending the PLOGI command to the target.

FIG. 12 shows the specific flow of the processing executed in the storage controller relating to the command issue allocation feature in this embodiment. It will be hereinafter assumed that the controller allocated to a primary volume in a copy pair that is about to be formed from now is the $1^{st}$ controller 6B, and the storage controller 3 is about to login to the initiator storage device 4A-4D via the communication port 20A allocated to the $0^{th}$ controller 6A. In the following explanation, the $0^{th}$ ($1^{st}$) controller 6A (6B) executes the processing. However, more specifically, the core 18A (18B) in the $0^{th}$ ($1^{st}$) controller 6A (6B) actually executes the processing.

Figure 12A:
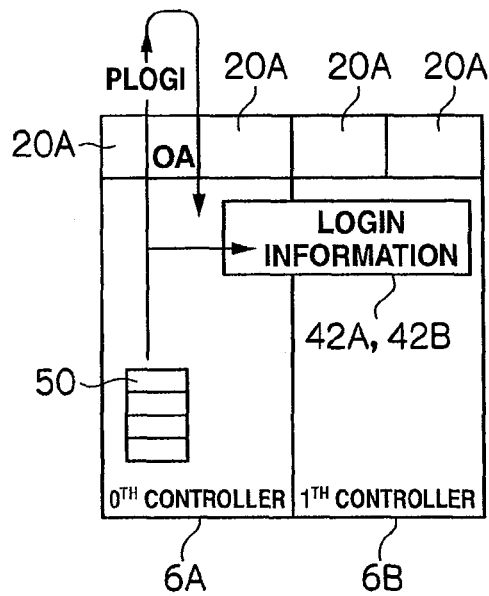
FIG. 12A-12D are conceptual diagrams illustrating a command issue allocation feature.

FIG. 12A shows the state where the $0^{th}$ controller 6A has just issued a PLOIN command ("PLOGI") for logging in to the initiator storage device 4A-4D via the communication port ("OA") 20A, and, as a result, logged in to a predetermined port for the relevant storage device 4A-4D. The $0^{th}$ controller 6A stores, after finishing the login, login information, such as an ID for the login target storage device 4A-4D, a port ID for the relevant storage device 4A-4D, and frame size, in the shared areas 42A and 42B in the local memories 14A and 14B respectively in the $0^{th}$ and $1^{st}$ controllers 6A and 6B. In FIG. 12A, a login management table 50 is a table for managing addresses where the login information is stored in the shared area 14A in the $0^{th}$ controller 6A when the $0^{th}$ controller 6A has logged in to the initiator storage device(s) 4A-4D via the "OA" communication port 20A.

Figure 12B:
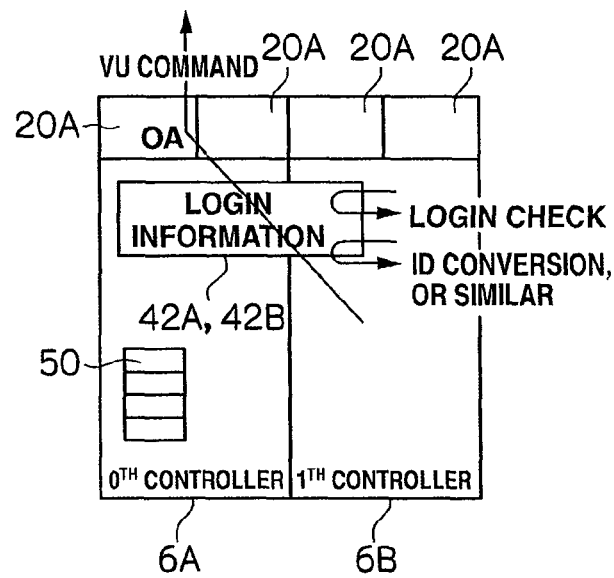

As shown in FIG. 12B, the $1^{st}$ controller 6B then refers to the shared area 42B in the local memory 14B in the same controller and checks whether or not the $0^{th}$ controller 6A has logged in to the target storage device 4A-4D ("Login Check"). After checking the login based on the login information stored in the shared memory 42B, the $1^{st}$ controller 6B executes necessary processing, such as processing for translating a target ID used in the storage controller 3 into an ID that conforms to the Fibre Channel standard ("ID Conversion, etc."). After that, the $1^{st}$ controller 6B writes an SCSI command indicating that an SCSI command is about to be sent (VU (vender Unique) command) to the shared areas in the local memories respectively in the $0^{th}$ and $1^{st}$ controllers 6A and 6B. By doing so, the SCSI command is sent by the $0^{th}$ controller 6A to the initiator storage device 4A-4D via the relevant communication port 20B.

Figure 12C:
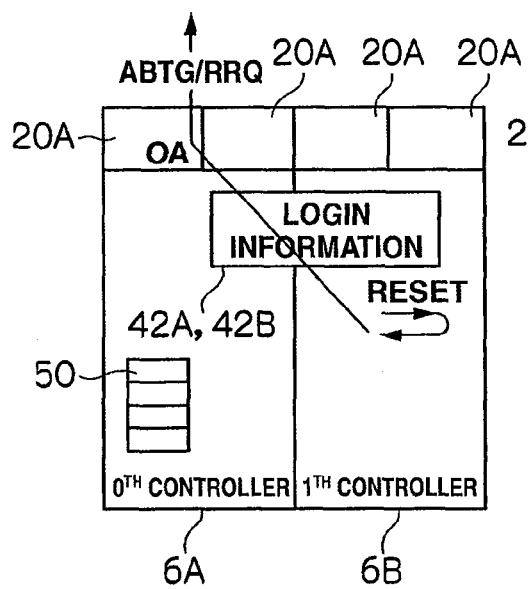

After that, if a timeout occurs in relation to the SCSI command, the $1^{st}$ controller 6B resets, as shown in FIG. 12C, the processing for the SCSI command and writes an ABTS command for aborting the processing for that SCSI command to the shared area 42A in the local memory 14A in the $0^{th}$ controller 6A. By doing so, the ABTS command is sent by the $0^{th}$ controller 6A to the initiator storage device 4A-4D via the relevant communication port 20A. If the initiator storage device 4A-4D aborts the processing for the SCSI command, the 1st controller 6B writes an RRQ command to the shared area 42A in the local memory 14A in the 0th controller 6A. By doing so, the RRQ command is sent by the 0th controller 6A to the initiator storage device 4A-4D via the relevant communication port 20A.

Figure 12D:
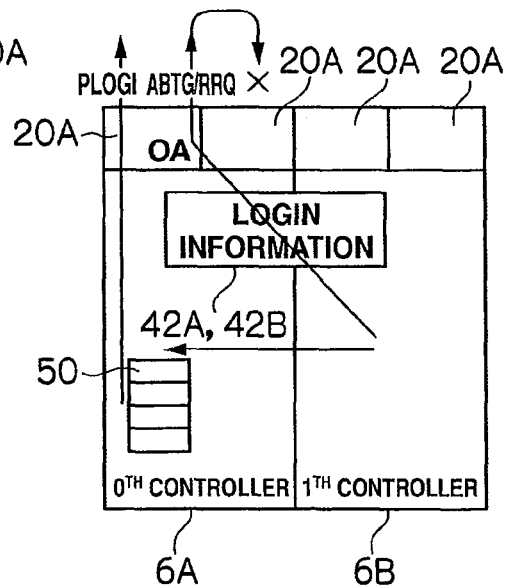

If a further timeout occurs in relation to the ABTS or RRQ command, the 1st controller 6B makes a request, as a last measure, for the 0th controller to issue a PLOGI command, indicating the reset, to the initiator storage device 4A-4D, as shown in FIG. 12D. The 0th controller, receiving the request, issues the PLOGI command to the initiator storage device 4A-4D via the communication port 20A allocated to that 0th controller itself.

(4) Advantage of this Embodiment

As described above, in the storage system 1 in this embodiment, the core 18A (18B) in the microprocessors 15A and 15B in the controller 6A (6B) monitors the state of loads on the core 18A (18B) itself, and changes the core allocated to the logical volume originally been allocated to the core 18A (18B) to another core 18A (18B) with a smaller load. By doing so, loads on the cores 18A (18B) can be equalized. With that configuration, deterioration in data I/O processing performance due to load imbalance can be efficiently and easily prevented.

Also, when load dispersion is conducted as described above when creating a copy pair in the storage system 1 in this embodiment, cores allocated to logical volumes relevant to each other are changed to a single core 18A (18B). Therefore, no communication occurs between the controllers 6A and 6B during copy processing, and the loads on the controllers 6A and 6B generated due to that communication can be prevented from being generated. With that configuration, deterioration in data I/O processing performance can be efficiently and easily prevented.

Also, in the storage system 1 in this embodiment, of link service-related commands, the commands issued in relation to an SCSI command are issued by the controller 6A (6B) allocated to a primary volume, and other link service-related commands relating to processing executed for each port are issued by the controller 6B (6A) allocated to the communication port 20A used when sending the commands to the target storage device 4A-4D. Therefore, communication for exchanging commands between the controllers 6A and 6B can be made unnecessary. With that configuration, loads on the controllers 6A and 6B due to that communication can be prevented from being generated, and reduced data I/O performance due to those loads can be efficiently and easily prevented.

(5) Other Embodiments

In the above described embodiment, the storage controller 3 includes the microprocessors 15A and 15B each having two cores (18AX, 18AY; 18BX, 18BY). However, the present invention is not limited to that configuration, and can also be used in a storage controller including microprocessors 15A and 15B each having a single core, or having three or more cores.

In the above described embodiment, the storage controller 3 includes two controllers 6A and 6B. However, the invention is not limited to that configuration, and can also be used in a storage controller having only one controller if a processor of the controller includes plural cores.

In the above described embodiment, a single core 18A (18B) includes the control unit for controlling data I/O to/from a logical volume allocated to that core 18A (18B) itself, a load monitor unit for monitoring the state of the load on each control unit, and a changer unit for changing, based on the state of the load monitored by the load monitor unit, a control unit allocated to a logical volume to another control unit to equalize loads on the control units. However, the invention is not limited to that configuration, and another core that functions as the load monitor unit for monitoring the state of a load on each core 18A (18B) may be provided separately from the cores 18A and 18B, so that the core 18A (18B) can execute, based on the state of the load monitored by the load monitoring function, processing that is executed by the changer unit in the above embodiment.

In the above described embodiment, the storage controller 3 is configured as shown in FIG. 1. However, the invention is not limited to that configuration, and can also be used in storage controllers of various configurations that provide, to a host computer, logical volumes created in a storage area provided by storage devices, and control data I/O to/from those logical volumes.

What is claimed is:

1. A storage controller for managing a plurality of logical volumes, the storage controller comprising:
a plurality of control units, each of the plurality of control units controlling data input/output (I/O) to/from at least one logical volume of the plurality of logical volumes,
wherein each of the plurality of logical volumes is allocated to a single control unit of the plurality of control units, and each of the plurality of control units comprise at least one core for controlling a respective logical volume to which least one core is allocated, and
wherein a first logical volume of the plurality of logical volumes is allocated to a first core, and a second logical volume of the plurality of logical volumes is allocated to a second core;
a load monitor unit for monitoring a state of a load on each of the plurality of control units; and
a changer unit for changing allocation of the first logical volume from the first core to the second core when the first logical volume and the second logical volume are related to each other.

2. The storage controller according to claim 1, further comprising:
a memory unit storing allocation information that defines allocation of each control unit to the at least one logical volume,
wherein each of the plurality of control units recognizes the at least one logical unit, to which each of the plurality of control units is allocated based on the allocation information, and
wherein the changer unit changes allocation of the plurality of control units from one logical volume to another logical volume by changing the allocation information.

3. The storage controller according to claim 1, further comprising:
a plurality of controllers for controlling data I/O to/from the logical volumes,
wherein each of the at least one core constitutes a microprocessor provided in each controller.

4. The storage controller according to claim 1, wherein the changer unit deters changing allocation by considering a copy pair among the plurality of logical volumes for a predetermined period of time after a previous change of allocation of the plurality of control units.

5. The storage controller according to claim 1, wherein if another logical volume has a content-related connection with an allocation change candidate logical volume, the changer unit makes a control unit allocated to the allocation change candidate logical volume and a control unit allocated to another logical volume that has a content-related connection with the allocation change candidate logical volume to be the same control unit.

6. The storage controller according to claim 1, wherein when creating a copy pair, if a control unit allocated to the logical volumes used for creating the copy pair differs from a control unit allocated to another logical volume that has a content-related connection with the logical volumes used for creating the copy pair, the changer unit changes the control unit allocated to the logical volumes used for creating the copy pair to the control unit allocated to another logical volume that has a content-related connection with those logical volumes used for creating the copy pair, or changes the control unit allocated to another logical volume that has a content-related connection with the logical volumes used for creating the copy pair to the control unit allocated to those logical volumes used for creating the copy pair.

7. The storage controller unit according to claim 6, wherein if the copy pair is a pair of logical volumes between which internal copy is to be executed, the changer unit changes a control unit allocated to a secondary volume to a control unit allocated to a primary volume.

8. The storage controller according to claim 6, wherein if the copy pair is a pair of at least one logical volume and a pool volume that stores snapshot data of that logical volume, the changer unit changes a control unit allocated to a primary volume to a control unit allocated to the pool volume.

9. The storage controller according to claim 6, wherein if the copy pair is a pair for asynchronous remote copy in which primary and secondary volumes are set in different logical volumes and data is copied between the primary and secondary volumes asynchronously with data write to the primary volume, a control unit allocated to the primary volume is changed to a control unit allocated to a pool volume that stores snapshot data of the primary volume, and a control unit allocated to the secondary volume is changed to the control unit allocated to a pool volume that stores snapshot data of the secondary volume.

10. The storage controller according to claim 1, further comprising:
a communication port used for communication with the storage device,
wherein if remote copy is conducted between primary and secondary volumes created in different storage devices, synchronously with data write from the host computer to the primary volume, and if a control unit allocated to the primary volume for the remote copy differs from a control unit allocated to the communication port for communication with the storage device in which the primary volume for the remote copy is set, a command for having the primary volume execute processing for a link service-related command is issued by the control unit allocated to the primary volume for the remote copy, and a command for having the primary volume execute processing for each port is issued by the control unit allocated to the relevant communication port.

11. A method for controlling a storage controller that manages a plurality of logical volumes, the storage controller including a plurality of control units, each of the plurality of control units controlling data input/output (O/I) to/from at least one logical volume of the plurality of logical volumes, wherein each of the plurality of logical volumes is allocated to a single control unit of the plurality of control units, and each of the plurality of control units comprises at least one core for controlling a respective logical volume to which the at lest one core is allocated, and wherein a first logical volume of the plurality of logical volumes is allocated to a first core, and second logical volume of the plurality of the logical volumes is allocated to a second core, the method comprising:
a first step of monitoring a state of a load on each of the control units; and
a second step of changing allocation the first logical volume from the first core to the second core when the first logical volume and the second logical volume are related to each other.

12. The control method according to claim 11, wherein the storage controller includes a memory unit storing allocation information that defines allocation of the control unit to the at least one logical volume, and each of the control units recognizes the at least one logical unit, to which each of the plurality of control units is allocated based on the allocation information, and changes, in the second step, allocation of the plurality of control units from one logical volume to another logical volume by changing the allocation information.

13. The control method according to claim 11, wherein the storage controller includes a plurality of controllers for controlling data I/O to/from the logical volumes, and each of the at least one core constitutes a microprocessor provided in each controller.

14. The control method according to claim 11, further comprising:
at third step of deterring changing allocation by considering a copy pair among the plurality of logical volumes for a predetermined period of time after previous change of allocation of the plurality of control units.

15. The control method according to claim 11, wherein in the second step, if another logical volume has a content-related connection with an allocation change candidate logical volume, a control unit allocated to the allocation change candidate logical volume and a control unit allocated to another logical volume that has a content-related connection with the allocation change candidate logical volume are made to the same control unit.

16. The control method according to claim 11, wherein when a copy pair is created, if a control unit allocated to the logical volumes used for creating the copy pair differs from a control unit allocated to another logical volume that has a content-related connection with the logical volumes used for creating the copy pair, the control unit allocated to the logical volumes used for creating the copy pair is changed to the control unit allocated to another logical volume that has a content-related connection with those logical volumes used for creating the copy pair, or the control unit allocated to another logical volume that has a content-related connection with the logical volumes used for creating the copy pair is changed to the control unit allocated to those logical volumes used for creating the copy pair.

17. The control method according to claim 16, wherein if the copy pair is a pair of logical volumes between which internal copy is conducted, a control unit allocated to a secondary volume is changed to a control unit allocated to a primary volume.

18. The control method according to claim 17, wherein if the copy pair is a pair of at least one of a logical volume and a pool volume that stores snapshot data of that logical volume, a control unit allocated to a primary volume is changed to a control unit allocated to the pool volume.

19. The control method according to claim 16, wherein if the copy pair is a pair for asynchronous remote copy in which primary and secondary volumes are set in different logical volumes and data is copied between the primary and secondary volumes asynchronously with data write to the primary volume, a control unit allocated to the primary volume is changed to the control unit allocated to a pool volume that stores snapshot data for the primary volume, and a control unit allocated to the secondary volume is changed to the control unit allocated to a pool volume that stores snapshot data of the secondary volume.

20. The control method according to claim 11, wherein the storage controller includes a communication port for communication with the storage device, and if remote copy is conducted between primary and secondary volumes created in different storage devices, synchronously with data write from the host computer to the primary volume, and if a control unit allocated to the primary volume for the remote copy differs from the control unit allocated to the communication port for communication with the storage device in which the primary volume for the remote copy is set, a command for having the primary volume execute processing for a link service-related command is issued by the control unit allocated to the primary volume for the remote copy, and a command for having the primary volume execute processing for each port is issued by the control unit allocated to the relevant communication port.

* * * * *